US 8,959,244 B2

(12) United States Patent
Lin et al.

(10) Patent No.: US 8,959,244 B2
(45) Date of Patent: Feb. 17, 2015

(54) SYSTEM AND METHOD FOR NETWORK AWARE ADAPTIVE STREAMING FOR NOMADIC ENDPOINTS

(75) Inventors: IChang Lin, Westborough, MA (US); Raj Nair, Lexington, MA (US); Chin-Cheng Wu, Carlisle, MA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 196 days.

(21) Appl. No.: 13/233,705

(22) Filed: Sep. 15, 2011

(65) Prior Publication Data

US 2012/0005364 A1 Jan. 5, 2012

Related U.S. Application Data

(63) Continuation of application No. PCT/US2010/028309, filed on Mar. 23, 2010.

(60) Provisional application No. 61/265,384, filed on Dec. 1, 2009, provisional application No. 61/242,094, filed on Sep. 14, 2009, provisional application No. 61/239,287, filed on Sep. 2, 2009, provisional application No. 61/162,559, filed on Mar. 23, 2009.

(51) Int. Cl.
| | |
|---|---|
| *G06F 15/16* | (2006.01) |
| *H04N 7/173* | (2011.01) |
| *G06Q 30/02* | (2012.01) |
| *H04L 29/06* | (2006.01) |

(52) U.S. Cl.
CPC .......... *G06Q 30/0241* (2013.01); *H04L 65/608* (2013.01); *H04L 65/80* (2013.01)
USPC ............. 709/232; 709/231; 709/235; 725/86; 725/93; 725/96

(58) Field of Classification Search
None
See application file for complete search history.

(56) References Cited

U.S. PATENT DOCUMENTS

| | | | |
|---|---|---|---|
| 6,615,166 B1 | 9/2003 | Guheen et al. | |
| 6,856,599 B1 * | 2/2005 | Kroon | 370/236 |
| 7,099,273 B2 * | 8/2006 | Ha et al. | 370/229 |
| 7,209,437 B1 * | 4/2007 | Hodgkinson et al. | 370/230 |
| 7,336,681 B1 | 2/2008 | Wilkinson | |
| 7,542,435 B2 | 6/2009 | Leon et al. | |
| 7,558,869 B2 | 7/2009 | Leon et al. | |
| 8,107,457 B2 * | 1/2012 | White et al. | 370/350 |
| 8,225,194 B2 * | 7/2012 | Rechsteiner et al. | 715/206 |

(Continued)

OTHER PUBLICATIONS

Pantos, R., HTTP Live Streaming: http://tools.ietf.org/html/draft-pantos-http-live-streaming-01, Apple Inc., Jun. 8, 2009, 18 pages.

(Continued)

*Primary Examiner* — Shirley Zhang

(57) ABSTRACT

In a system for streaming data over a network, the type and rate of streaming are automatically varied based on available network bandwidth. Video media is transcoded into different bit rate encodings that are divided into segment files. Segments are sent from a network-aware adaptive streaming (NAAS) server and reassembled and presented to a media player at a client device. The system may download additional segment files ahead of time from multiple NAAS servers to increase throughput. A playback status ("bookmark") may be maintained to keep track of what the user has viewed and to allow the user to continue playing from where the user left off. The user may continue watching from the bookmark point on the same device or on a different device.

28 Claims, 11 Drawing Sheets

(56) References Cited

U.S. PATENT DOCUMENTS

| | | | |
|---|---|---|---|
| 2003/0009694 A1 | 1/2003 | Wenocur et al. | |
| 2003/0065542 A1 | 4/2003 | Gliozzi et al. | |
| 2003/0135631 A1* | 7/2003 | Li et al. | 709/231 |
| 2004/0015591 A1* | 1/2004 | Wang | 709/228 |
| 2004/0098748 A1* | 5/2004 | Bo et al. | 725/105 |
| 2005/0021830 A1* | 1/2005 | Urzaiz et al. | 709/234 |
| 2006/0015637 A1* | 1/2006 | Chung | 709/232 |
| 2006/0184688 A1* | 8/2006 | Ganguly et al. | 709/232 |
| 2006/0195547 A1 | 8/2006 | Sundarrajan et al. | |
| 2007/0130012 A1 | 6/2007 | Yruski et al. | |
| 2008/0034104 A1* | 2/2008 | Kariti et al. | 709/231 |
| 2008/0082551 A1 | 4/2008 | Farber et al. | |
| 2012/0005365 A1* | 1/2012 | Ma et al. | 709/231 |
| 2012/0110140 A1* | 5/2012 | Chapweske | 709/219 |

OTHER PUBLICATIONS

Zambelli, Alex, "Alex Zambelli's Microsoft Media Blog, Microsoft Media Platform, streaming video, Smooth Streaming, H.264, VC-1, Silverlight, Windows Media," 21 pages, (c) 2012, Silverlight smooth streaming: http://alexzambelli.com/blog/2009/02/10/smooth-streaming-architecture/, Proudly powered by Word Press. 2010 Weaver by WPWeaver.info.

RealNetworks, Inc., whitepapers, Helix Mobile Server Rate Control for Mobile Networks: http://docs.real.com/docs/rn/whitepapers/Enhanced_Rate_Control.pdf, RealNetworks, Inc., © 2008, 44 pages.

RealNetworks, Inc., Chapter 2: Streaming Media Basics, http://service.real.com/help/library/guides/mproducerplus/htmfiles/preparin.htm, Copyright © 1998-1999, 4 pages.

Goyal, V.K., IEEE Xplore Digital Library, IEEE.org, Multiple description coding: compression meets the network: http://ieeexplore.ieee.org/xpl/freeabs_all.jsp?arnumber=952806, Signal Processing Magazine, IEEE, Date of Publication: Sep. 2001, vol. 18 , Issue: 5, 74-93.

Kim, T., IEEE Xplore Digital Library, IEEE.org, A comparison of heterogeneous video multicast schemes: Layered encoding or stream replication: http://ieeexplore.ieee.org/xpl/freeabs_all.jsp?arnumber=1542089, Multimedia, IEEE Transactions on . . . , Date of Publication: Dec. 2005, Mobile Syst. Group, Freescale Semicond., Austin, TX, USA, Ammar, M.H., vol. 7 , Issue: 6, pp. 1123-1130.

Li, Y., IEEE Xplore Digital Library, IEEE.org, Content-Aware Playout and Packet Scheduling for Video Streaming Over Wireless Links: http://ieeexplore.ieee.org/xpl/freeabs_all.jsp?arnumber=4543842, This paper appears in: Multimedia, IEEE Transactions on . . . , Date of Publication: Aug. 2008, Qualcomm, Campbell, CA, Markopoulou, A., Apostolopoulos, J.; Bambos, N., vol. 10 , Issue: 5, pp. 885-895.

Lomar, T., Fast Content Switching with RTSP 2.0, draft-lohmar-mmusic-rtsp-fcs-00, http://tools.ietf.org/html/draft-lohmar-mmusic-rtsp-fcs-00, Ericsson GmbH, Jul. 29, 2003, 15 pages.

Schulzrinne, H., Real Time Streaming Protocol (RTSP), http://www.rfc-editor.org/rfc/rfc2326.txt Columbia U., Apr. 1998, 82 pages.

Schulzrinne, H., RTP: A Transport Protocol for Real-Time Applications, http://www.rfc-editor.org/rfc/rfc3550.txt, Columbia U., Jul. 2003, 93 pages.

Huitema, C., Real Time Control Protocol (RTCP) attribute in Session Description Protocol (SDP), http://www.rfc-editor.org/rfc/rfc3605.txt, Microsoft, Oct. 2003, 8 pages.

David Hassoun, Dynamic stream switching with Flash Media Server 3, Adobe Media Server Developer Center, Jan. 12, 2009, pp. 1-39.

Cybertech Media Group, Streaming Video Encoded for Surestream or Adaptive Rate Deployment Versus Individually Encoded Bit Rate Streams, pp. 1-3.

* cited by examiner

Segment Structure

| Segment Number | File Loc | Segment Frame Data (i-, b-, and p-frames) |
|---|---|---|
| | | |

Segment Numbers: start from 1 and increases sequentially by one

File loc is the location of this data in the media file.

SYSTEM AND METHOD FOR NETWORK AWARE ADAPTIVE STREAMING FOR NOMADIC ENDPOINTS

BACKGROUND

This invention relates in general to streaming media and more specifically to implementing dynamic bit rate adaptation while streaming media on demand.

Available bandwidth in the internet can vary widely. For mobile networks, the limited bandwidth and limited coverage, as well as wireless interference can cause large fluctuations in available bandwidth which exacerbate the naturally bursty nature of the internet. When congestion occurs, bandwidth can degrade quickly. For streaming media, which require long lived connections, being able to adapt to the changing bandwidth can be advantageous. This is especially so for streaming which requires large amounts of consistent bandwidth.

In general, interruptions in network availability where the usable bandwidth falls below a certain level for any extended period of time can result in very noticeable display artifacts or playback stoppages. Adapting to network conditions is especially important in these cases. The issue with video is that video is typically compressed using predictive differential encoding, where interdependencies between frames complicate bit rate changes. Video file formats also typically contain header information which describe frame encodings and indices; dynamically changing bit rates may cause conflicts with the existing header information.

There have been a number of solutions proposed for dealing with these problems. One set of solutions is to use multiple independently encoded files, however, switching between files typically requires interrupting playback, which is undesirable. These solutions also typically require starting again from the beginning of the file, which is very disruptive. Solutions based on the RTSP/RTP transport delivery protocols have the advantage of being frame-based, which eases the switching between streams, but they require that multiple streams be running simultaneously, which is bandwidth and server resource inefficient. Other solutions propose alternate file encoding schemes with layered encodings. Multiple files are used, but each file can be added to previous files to provide higher quality. Rate adaptation is performed by sending fewer layers of the encoding, during congestion. These schemes require much more complex preprocessing of files, and the codecs are not typically supported natively by most devices. For mobile devices with limited resources, this can be a large barrier to entry.

More recently, schemes have been proposed which use multiple files, each encoded at a different bit rate, but then the files are divided into segments. Each segment is an independently playable file. The segments provide fixed boundaries from which to switch and restart playback. This solves the problem of having to restart from the beginning, and limits the playback disruption. The granularity is not nearly as fine as with RTSP which may be as low as 1/30th of a second, but rather at the granularity of seconds to tens of seconds. With finer granularity, disruption to users is minimized, however, segment overhead is maximized. In cases where round trip latency between the client and the server is higher than the segment duration, undue overhead is introduced as the rate cannot be adapted that quickly. If caching is employed, cache distribution and synchronization latency may compound these issues. However, coarser granularity limits the utility of the switching scheme. If the available network bandwidth varies at a period less than the segment duration, inability to adapt in a timely manner negates the value of segmentation.

Content providers produce content and monetize it through a variety of means (advertising sponsorship, product placement, direct sales, etc.). One of the primary methods for monetizing video content is the periodic insertion of video advertisements, as with television and some internet-based long form video content delivery, as well as through strictly pre-roll and/or post-roll advertisements as with movies and some short form video content delivery.

For desktop delivery of media, switching between content and ads is fairly seamless given the high bandwidth provided by broadband connections and the high CPU power of modern desktop PCs. For mobile delivery of media, however, high latency and low bandwidth cellular networks coupled with low CPU power in most handsets can cause long playback disruptions when retrieving separate content and advertisement video files. On-demand transcoding and stitching of advertisements to content is a CPU intensive task which requires dedicated servers. It incurs the cost of maintaining servers and prevents the use of tried and true content delivery networks (CDN). To alleviate this, pre-stitching of advertisements to content is often used to limit costs. However, advertisements are typically rotated periodically with changing ad campaigns. For long form content, changing the ads may require re-stitching extremely large amounts of content and then re-uploading all of that content to a CDN. Network bandwidth is typically a bottleneck and uploading can take a long time; upload can also be costly if network access is paid for by the amount of bandwidth used. With long form content, the ads are typically very small, relative to the size of the feature content. Re-uploading the entire file, including both ad and feature content needlessly incurs the cost of re-uploading the feature content.

SUMMARY

Methods and apparatus are disclosed for streaming data over a network. The type and rate of streaming are varied based on the network bandwidth available without interrupting the user. Stream data throughput may be maximized in a network-friendly manner during highly variable network conditions.

In one embodiment, video media is transcoded into a plurality of different bit rate encodings. The plurality of encodings is divided into a collection of segment files. The segments are sent from a network-aware adaptive streaming (NAAS) server and reassembled at the client and presented to the media player. In one embodiment, the network type such as Wi-Fi, 3G, Edge, etc. is detected and used to determine the range of available data rates. In another embodiment, available bandwidth is determined by segment download rate. During sustained extreme (i.e. poor) network conditions, retransmissions are avoided in order to avoid overwhelming the network. Under good network conditions, the system downloads additional segment files ahead of time from multiple NAAS servers to increase the total throughput.

In one embodiment, the client stores playback status on the local device. In another embodiment, the client sends playback status back to the NAAS servers. The playback status is used to keep track of what the user has viewed. In one embodiment, the playback status (referred to as a bookmark herein) is used to allow users to continue playing from where they left off. In one embodiment the user may continue watching from the bookmark point on the same device. In another embodiment, the user may continue watching from the bookmark point on a different device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
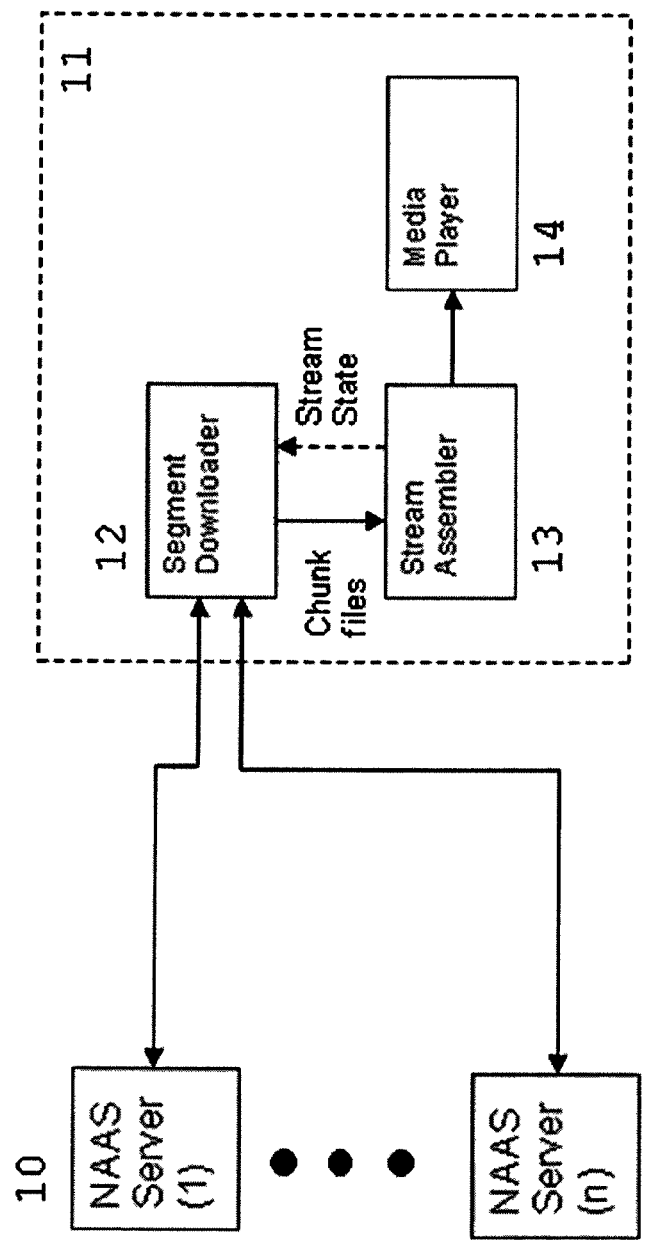
FIGS. 1 and 2 are block diagrams of systems capable of conducting procedures, in accordance with various embodiments of the invention.

In FIG. 1 is a block diagram for one embodiment of the present invention. It shows a client device 11 and a plurality of network-aware adaptive streaming (NAAS) servers 10. The client device 11 and NAAS servers 10 are both typically computerized devices which include one or more processors, memory, storage (e.g., magnetic or flash memory storage), and input/output circuitry all coupled together by one or more data buses, along with program instructions which are executed by the processor out of the memory to perform certain functions which are described herein. Part or all of the functions may be depicted by corresponding blocks in the drawings, and these should be understood to cover a computerized device programmed to perform the identified function.

In one embodiment, the NAAS servers 10 (referred to as servers herein) each contain a copy of the content being delivered to the client 11. In one embodiment, the servers 10 may be collocated in a single data center. In another embodiment, the servers 10 may be geographically distributed in multiple data centers. In another embodiment, the servers 10 may be physically in the same region, but connected to the client 11 through separate network paths (e.g. through different network service providers). In one embodiment, the servers 10 are situated as part of a content delivery network (CDN). The segment downloader 12 retrieves the media from the servers 10 in segments. In one embodiment, the segments are of fixed size (measured in bytes), resulting in variable duration segments. In another embodiment, the segments are of a fixed duration (measured in rendering time), resulting in variable size segments. In one embodiment, the segments of media are stored as separate files. In another embodiment, the segments of media are stored as a single file, and segments are created by reading the specific subset of data from the file. In one embodiment, the segment downloader 12 retrieves the segment data files using the HTTP protocol. In another embodiment, the segment downloader 12 retrieves segments of data from a single file using HTTP range GETs.

While downloading the segments, the segment downloader 12 measures the network bandwidth. If the bandwidth falls below a certain threshold for the current network type then the media player 14 is notified that insufficient bandwidth exists. The threshold is the bandwidth needed to download the smallest playable chunk, e.g., all frames between a pair of I-frames, in the current bitrate during the time to play out the buffered content. In one embodiment, the segment downloader 12 sends TCP acknowledgements for non-received data to prevent TCP retransmissions and limit network congestion. In another embodiment, the segment downloader 12 resets the TCP connection to limit network congestion. This is known as "squelching" and is accomplished by sending an acknowledgment for the sequence number of the last TCP-segment received from the server, indicating that everything until that segment has been received regardless of whether the intervening data were actually received. This would prevent any retransmissions from the server. The downloader also chooses the lowest acceptable bitrate.

In another embodiment, there is a special server modification in which the server responds to a special http GET command with a mime-header labeled "SWITCH" to cancel the last segment request and request at a lower bitrate. This request may also used to send the acknowledgment to squelch retransmissions. The switch command is used to propagate the squelch upwards through the application and enable the server to switch to a new lower bitrate at the next segment indicated in the body of the request. The server could choose to advance to a more recent segment in the response as indicated via a SWITCH response header. The interchange and segment structure are described below with reference to FIGS. 12 and 13.

In another embodiment, the segment downloader 12 continues to download data in the hope of restarting playback at some point in the future. The downloader is assumed to be at the lowest bitrate and is moving the window forwards using the gratuitous ACK method (and squelch and switch methods described earlier).

If the bandwidth rises above a certain threshold for the current network type then the segment downloader 12 will begin to issue multiple parallel requests for sequential segments. In one embodiment, all requests are sent to the same server 10. In another embodiment, the requests are spread across multiple servers 10. Spreading the load across multiple servers allows for network path diversity and server load distribution. In one embodiment, server load balancing is performed explicitly by the client 11. In another embodiment, server load balancing is performed by the network, either through DNS load balancing or server load balancing within the data center.

Data retrieved by the segment downloader 12 is passed to a stream assembler 13. The stream assembler 13 reassembles the segments, and parses out the video frames and provides them to a media player 14. In one embodiment, the stream assembler 13 is also responsible for decrypting the data provided by the segment downloader 12. As the stream assembler 13 provides data to the media player 14, it keeps track of the current position of the media stream. In one embodiment the media stream position is derived from the frames requested by the media player 14. In one embodiment, the stream position is adjusted for the size of the media player's 14 playback buffer. In one embodiment, the stream position is saved locally as a bookmark. In another embodiment, the stream position is provided by the stream assembler 13 to the segment downloader 12, so that a bookmark may be set on the server 10. The server 10 stores the bookmark as per-user/per-media metadata in the server database.

When the media player 14 starts, it may either request that rendering begin at the start of the content, or it may request that rendering begin at the last known bookmark position. In the latter case, the segment downloader 12 retrieves the bookmark metadata from the server 10, calculates the necessary offsets and begins downloading segments from that point.

Figure 2:
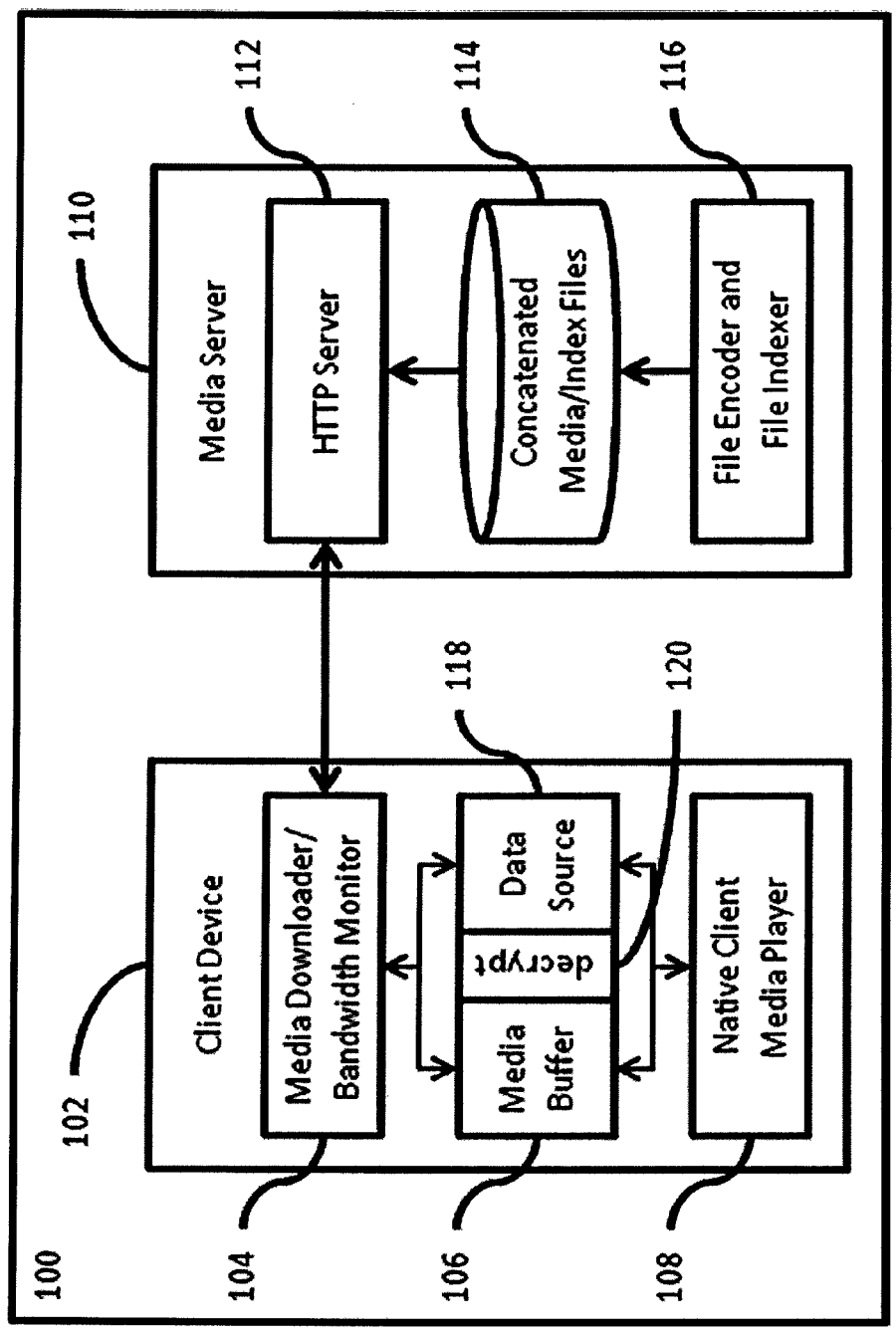

In FIG. 2 is a block diagram 100 for one embodiment of the present invention. It shows a client device 102 and media server 110. The client device 102 and media server 110 are both typically computerized devices which include one or more processors, memory, storage (e.g., magnetic or flash memory storage), and input/output circuitry all coupled together by one or more data buses, along with program instructions which are executed by the processor out of the memory to perform certain functions which are described herein. Part or all of the functions may be depicted by corresponding blocks in the drawings, and these should be understood to cover a computerized device programmed to perform the identified function.

The media server 110 uses a standard HTTP server 112 to deliver data. The concatenated files are stored on a storage device 114. The storage may be local or remote and may use any of a number of storage technologies, as should be known to those skilled in the art. The concatenated files are generated by a file encoder 116. The file encoder 116 is responsible for transcoding source media files into a plurality of encodings, where each encoding uses a different bit rate. In one embodiment, default encoding parameters are provided in a configuration file. In another embodiment, default encoding parameters are provided at invocation. In one embodiment, individual source files may override default encoding parameters via an accompanying configuration file. In another embodiment, individual source files may override default encoding parameters using parameters provided at invocation. The file encoder 116 then concatenates the plurality of encodings into a single concatenated file. The individual encodings are of compatible formats for concatenation, the constraints of which should be known to those skilled in the art.

In one embodiment the file encoder 116 may be invoked manually. In another embodiment, the file encoder 116 may be asynchronously invoked programmatically, when new source media is available. In another embodiment, the file encoder 116 may be invoked periodically to check if new source media is available. In one embodiment, the file encoder 116 logs transcoding and concatenation to a file or database. The client 102 may be notified asynchronously of the availability of new files.

The file encoder 116 is also responsible for generating the rate map index files for each concatenated file. During the transcoding and concatenation processes, the file encoder 116 has all the information necessary to generate the rate map index files. The transcoding configurations contain information on the granularity and units for index information. The rate map index files are written to the storage device 114 with the concatenated media files.

In one embodiment, the encodings are concatenated in descending order of bit rate. This scheme provides highest quality for environments which expect few network interruptions. In another embodiment, the encodings are concatenated in ascending order of bit rate. This scheme adopts a slow start paradigm for challenged environments which have higher probability of network interruption. In another embodiment, the encodings are concatenated in an order based on the expected encoding transitions. In one embodiment, multiple concatenation orders may be used, creating a plurality of concatenated files for a given format, for a given source media. The physical interface type of the client device may be used as a predictor of network quality. In one embodiment, a mobile client device with both Wi-Fi and cellular capabilities may attach different network quality expectations to the two interfaces and select different concatenated files, when retrieving data over a given interface. The concatenated files will contain the same encodings, just in a different order, therefore switching between concatenated files requires only a basic remapping of offsets. The selection of a given concatenated file is preferably based on which initial encoding is desired.

In one embodiment, the client 102 contains a downloader 104. The downloader 104 is responsible for interacting with the media server 110 to retrieve data required by a data source 118. This includes encoded media data as well as file index data. In one embodiment, the downloader 104 uses HTTP range GETs to directly access the encoded media data. The HTTP range GETs also allow the downloader 104 to perform data retrieval pacing. Pacing allows the client 102 to limit its network bandwidth usage. The data retrieved is passed to the data source 118. In one embodiment, the downloader 104 uses HTTP range GETs to directly access the rate map index file. The HTTP range GETs allow the downloader 104 to access only the rate map index data required, preventing the retrieval of unnecessary data. In another embodiment, the downloader 104 uses HTTP GETs with query strings, wherein the query string specifies the rate map index desired and the HTTP server 112 uses that information to retrieve the desired information from the rate map index file. There are numerous methods for integrating application level support with standard HTTP servers (e.g. CGI scripts, java servlets, Ruby-on-Rails applications, PHP script, etc.) as should be known to those skilled in the art.

The data source 118 uses rate map index data to manage media data prefetching, when switching encodings. The data source 118 stores media data in a media buffer 106. In one embodiment, the media buffer 106 is implemented as a circular buffer to limit memory consumption. A circular buffer is typically a small buffer relative to the size of the data it will hold, i.e. smaller than the data it is intended to hold. It is logically circular in that once the end of the buffer is reached, subsequent data is written to the front of the buffer, overwriting the oldest data. It is useful for devices that have limited memory, and do not have the capacity to store the entire concatenated file, however, it increases the complexity of managing the media buffer 106. In another embodiment, the media buffer 106 is implemented as a full flat buffer to ease offset calculations. With a full flat buffer, the data is stored, in its entirety, in the media buffer 106. This simplifies buffer management, as offsets are exact, rather than modulo the buffer size as with a circular buffer, however, it requires that the client device have enough storage space to hold the entire file, which may not be the case for some devices (e.g. mobile phones). In one embodiment, the data retrieved by the downloader 104 may be encrypted. Before the data source 118 adds the data to the media buffer 106, the data is decrypted. A decryption buffer 120 is used to store encrypted information until it is decrypted and can be transferred to the media buffer 106.

The downloader 104 is also responsible for calculating average available bandwidth. In one embodiment, the downloader 104 uses HTTP range GETs to limit retrieval sizes, and periodically calculates the available bandwidth based on download time and size of data retrieved. This information is also passed to the data source 118. The data source 118 uses the bandwidth information to determine when to switch encodings. When the data source 118 determines that a change in encoding is necessary, it determines the switch over time and notifies the downloader 104 to retrieve the rate map index information for that switch over time. Once the data source has the rate map index information, and there is room available in the media buffer 106, it notifies the downloader 104 to begin downloading media data from the new offset.

In one embodiment, the client 102 relies on the client's native media player 108 as a rendering engine. The client requests media data from the data source 118. In one embodiment, the data source 118 acts as any other data source in the system (e.g. a local file). In another embodiment, the data source 118 may be implemented as a local network proxy (e.g. an HTTP proxy server). Implementation of data proxies, data sources, and device resources in general should be known to those skilled in the art. The media is retrieved from the media buffer 106 and returned to the native media player 108. When a change in encoding is required and the necessary media data is available in the media buffer 106, the data source 118 notifies the native media player 108 and issues a seek operation. The seek results in the native media player 108 issuing a new request to the data source 118 for data at the new offset. The data source 118 switches the read position of the media buffer 106 to the location of the new media encoding data. The data is then returned from the media buffer 106 to the native media player 108.

Figure 3:
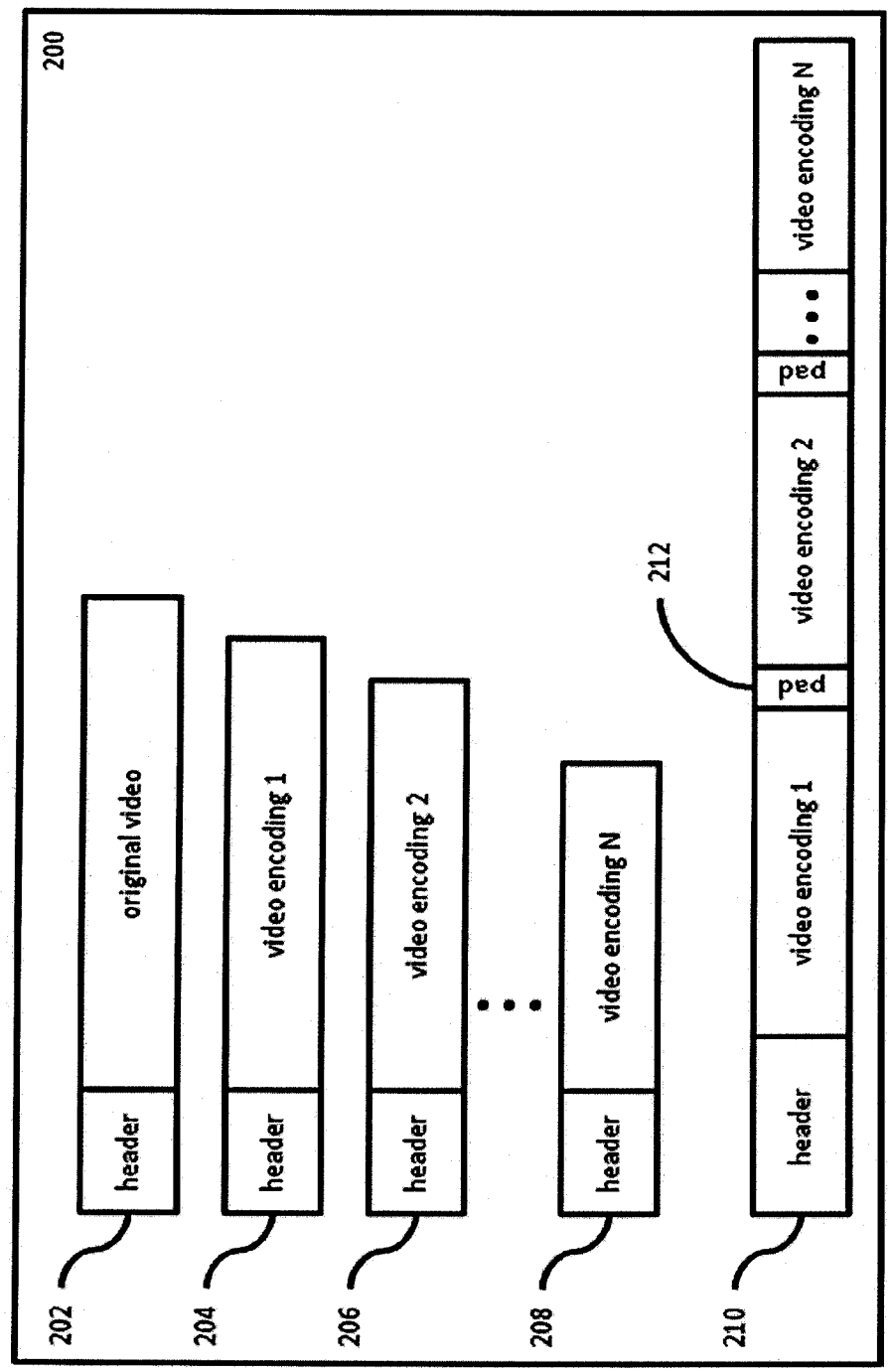
FIG. 3 is a diagram of files used to create the single concatenated file, in accordance with an embodiment of the present invention.

In FIG. 3 is a diagram 200 of files 202, 204, 206, and 208 used by the file encoder 116, in one embodiment of the present invention, to create the concatenated media file 210. The source media file 202 is transcoded into a plurality of encodings 204, 206, 208, where each successive encoding is done at a lower bit rate than the previous (e.g. encoding 206 is a lower bit rate than encoding 204, and encoding 208 is a lower bit rate than encoding 206, etc). The differences in target bit rates are preferably large enough that the video compression schemes can actually achieve a difference in encoded bit rate, but not so large that transition between bit rates is overly disruptive to the viewer. For a given resolution and frame rate, which are preferably consistent through each encoding, there is typically a minimum achievable bit rate, below which the video cannot be reasonably compressed. In one embodiment, a source video may be encoded at resolution of 320×240, at a frame rate of 15 frames per second, and with three target bit rates of 500 kbps, 350 kbps, and 200 kbps.

The concatenated file 210 includes concatenations of the individual encodings 204, 206, and 208 in sequence, without interleaving. Between each encoding, padding 212 may be inserted. The padding 212 is use to simplify offset calculations, and to provide a buffer zone for the data source 118 to issue stop commands to the native media player 108. In one embodiment, the padding 212 may take the form of a video advertisement (typically between 5 and 30 seconds). In another embodiment, the padding 212 may take the form of a static banner advertisement which is displayed for a certain amount of time (typically between 5 and 30 seconds). In another embodiment, the padding 212 may take the form of a blank video (i.e. black screen) which is displayed for a certain amount of time (typically between 5 and 30 seconds).

Figure 4:
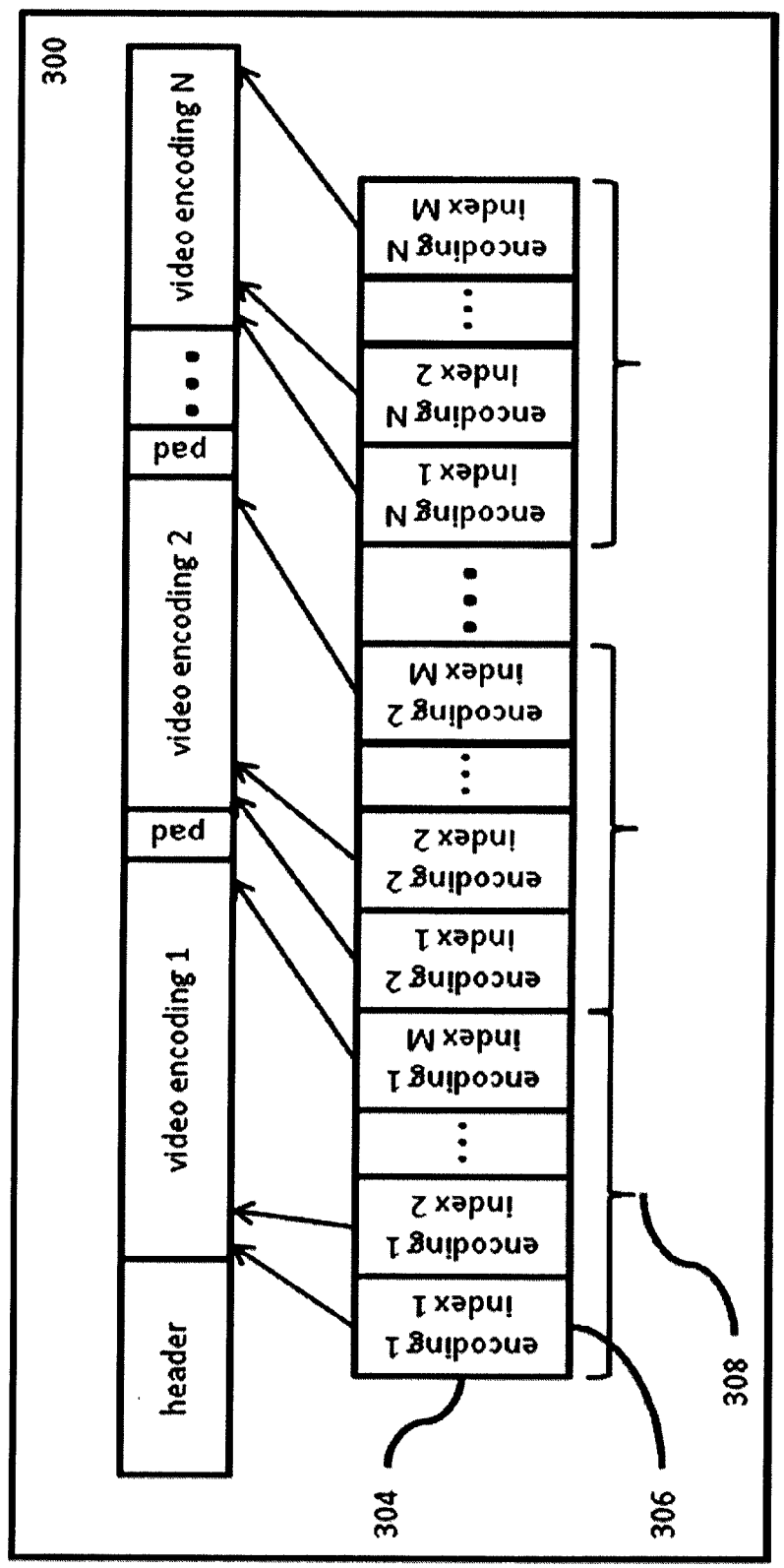
FIG. 4 is a diagram of a rate map index file used to map concatenated file byte offsets to time offsets, in accordance with an embodiment of the present invention.

In FIG. 4 is a block diagram 300 of a rate map index file 304, created by the file encoder 116, in one embodiment of the present invention. Each of the rate map indices 306 is of uniform size, and packed without padding into the rate map index file 304. The rate map indices 308 for each encoding are packed contiguously and in order, with the rate map indices of the encodings packed in the same order as the encodings are packed in the concatenated file 210.

Figure 5:
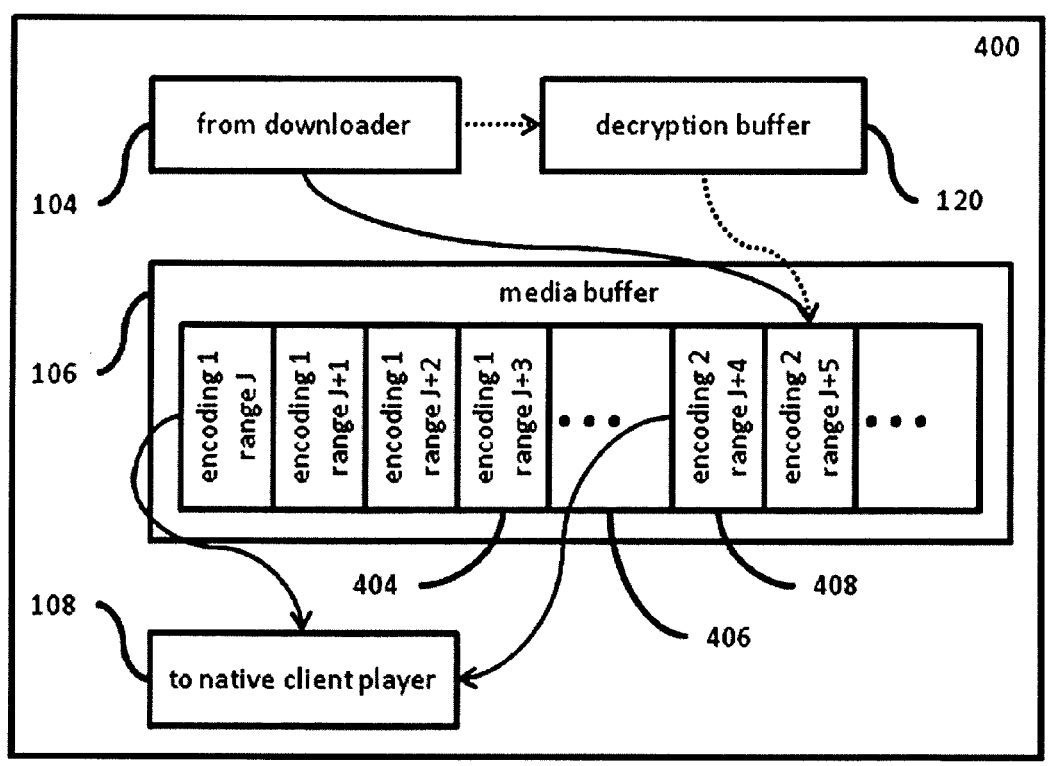
FIG. 5 is a diagram of a buffer and data source management used, in accordance with an embodiment of the present invention.

In FIG. 5 is a block diagram 400 of the buffer management performed by the data source 118, in one embodiment of the present invention. Data arrives from the downloader 104 and is placed into the media buffer 106. In one embodiment, the encoded data is encrypted, and is first placed in the decryption buffer 120. Once the encrypted data is decrypted, it is moved to the media buffer 106. When an encoding switch is executed, the downloader 104 continues to deliver data 404 for the current encoding until the switch over time (which may be in the future) is reached. Additional buffer space 406 is reserved to accommodate the remaining data for the current encoding. In one embodiment, the data 408 for the new encoding is prefetched from the server and placed in the media buffer, beyond the reserved space 406. When the switch over is signaled by the data source 118 to the native media player 108, data will begin being sourced from the new encoding data 408.

In one embodiment, switching encodings to one of lower bit rate is initiated when the average bandwidth falls below the current encoding's bit rate, and the buffer occupancy of the media buffer 106 falls below the playback threshold:

```
int bandwidth_avg        // average available network bandwidth
int video_bit_rate       // current video encoding bit rate
int buffer_occupancy     // seconds of video currently in the buffer
int playback_thresh      // seconds of video buffered before playback starts
if bandwidth_avg < video_bit_rate && buffer_occupancy < playback_thresh
    for each encoding sorted by bit rate in descending order
        if encoding.bit_rate < bandwidth_avg && encoding.bit_rate !=
video_bit_rate
            change encoding
            break
        end
    end
end
```

In this scheme, the average network bandwidth is unable to sustain the video playout rate and a playback stoppage is imminent once the buffer runs out. This scheme requires relatively few calculations to determine when to switch encodings, however, it also has relatively low capability for predicting when a stoppage will occur. The encoding to switch to is the next lowest bit rate encoding whose bit rate is less than the average network bandwidth. Switching encodings to one of higher bit rate is initiated when the buffer occupancy of the media buffer 106 has reached its capacity and the average bandwidth exceeds the encoding bit rate of another encoding:

```
int bandwidth_avg          // average available network bandwidth
int video_bit_rate         // current video encoding bit rate
int buffer_occupancy       // seconds of video currently in the buffer
int buffer_capacity        // seconds of video the buffer can hold
if bandwidth_avg > video_bit_rate && buffer_occupancy > buffer_capacity
   for each encoding sorted by bit rate in descending order
      if encoding.bit_rate < bandwidth_avg && encoding.bit_rate != video_bit_rate
         change encoding
         break
      end
   end
end
```

The encoding to switch to is the highest bit rate encoding whose bit rate is less than the average network bandwidth. This is an optimistic approach which assumes no further degradation in bit rate. This scheme works well when connected to a reliable, high bandwidth network. It waits until the last minute to change rate, without predicting when a rate range may be necessary.

In another embodiment, a rate predictive scheme is used, where the current average bandwidth estimate represents the incoming data rate for the media buffer 106, and the current video bit rate represents the outgoing data rate for the media buffer 106. The historical bandwidth samples are used as a predictor of future bandwidth availability and future incoming data rates for the media buffer 106. The alternate video bit rates available are used to vary the possible future outgoing data rates for the media buffer 106. The rate switching scheme uses the future incoming and outgoing data rates to estimate the future occupancy of the media buffer 106. A threshold is set for optimal buffer occupancy. The optimal buffer occupancy is selected to minimize the probability of under-running the native media player 108, while also limiting device resource usage (i.e. limiting the storage requirement of the media buffer 106).

```
int bandwidth_cur          // current estimated network bandwidth
int video_bit_rate         // current video encoding bit rate
array bandwidth_hist       // historical bandwidth measurements
array encoding_rates       // bit rates of other available encodings
int buffer_occupancy       // seconds of video currently in the buffer
int buffer_capacity        // seconds of video the buffer can hold
int buffer_optimal_hi      // high threshold for optimal number of seconds
                           // of video to keep in the buffer
int buffer_optimal_lo      // low threshold for optimal number of seconds
                           // of video to keep in the buffer
int prediction_period      // seconds into the future to predict occupancy
int acceleration
int incoming
int outgoing
int predicted_occupancy
acceleration = calculate_rate_of_change(bandwidth_hist)
incoming = (bandwidth_cur + (acceleration / 2)) * prediction_period
outgoing = video_bit_rate * prediction_period
predicted_occupancy = buffer_occupancy + incoming − outgoing
if predicted_occupancy < buffer_optimal_lo || predicted_occupancy > buffer_optimal_hi
   for each encoding_rate in encoding_rates sorted from highest to lowest
      outgoing = encoding_rate * prediction_period
      predicted_occupancy = buffer_occupancy + incoming − outgoing
      if predicted_occupancy > buffer_optimal_lo &&
         predicted_occupancy < buffer_optimal_hi
            change encoding
            break
      end
   end
end
```

The algorithm shown above uses a basic linear prediction scheme for estimating future bandwidth. In one embodiment a linear bandwidth prediction scheme is used. This type of scheme requires less complexity to implement and can be used to smooth out samples with high jitter, however it provides coarse granularity for predicting changes in bandwidth. In another embodiment, a higher degree interpolation may be used to better simulate the changes in available bandwidth. This type of scheme requires more computational resources to implements, but provides a finer granularity for detecting changes in bandwidth. There are a number of algorithms for using historical data to approximate rate of change and should be known to those skilled in the art.

Once the bandwidth has been estimated, the maximum number of bits of data which could be received is calculated. In one embodiment, the maximum number of bits received may be reduced by a constant factor to provide bandwidth overhead and to limit the impact on network resources. The predicted future buffer occupancy for the current encoded bit rate is calculated. If the occupancy falls within the thresholds for optimal buffer usage, then nothing is done. If the occupancy falls outside the thresholds for optimal buffer usage, then predictions are performed for the other available encoding bit rates. The algorithm shown above checks to see if one of the alternate encodings can achieve the desired buffer occupancy. In one embodiment, an alternate encoding is selected only if it can achieve the desired buffer occupancy. In another embodiment, an alternate encoding is selected if it provides a closer match to the desired buffer occupancy.

```
if current_bit_rate_predicted_occupancy < buffer_optimal_lo
   current_bit_rate_distance = buffer_optimal_lo − current_bit_rate_predicted_occupancy
else if current_bit_rate_predicted_occupancy > buffer_optimal_hi
   current_bit_rate_distance = current_bit_rate_predicted_occupancy − buffer_optimal_hi
end
if new_bit_rate_predicted_occupancy < buffer_optimal_lo
   new_bit_rate_distance = buffer_optimal_lo − new_bit_rate_predicted_occupancy
else if new_bit_rate_predicted_occupancy > buffer_optimal_hi
   new_bit_rate_distance = new_bit_rate_predicted_occupancy − buffer_optimal_hi
end
if new_bit_rate_distance < current_bit_rate_distance
   change encoding
end
```

In the scheme above, a new encoding is selected if it is deemed better than the previous one, by being closer to the desired buffer occupancy. In another embodiment, additional weight may be given to having higher rather than lower occupancy, though this may also be achieved by setting the high threshold higher.

Figure 6:
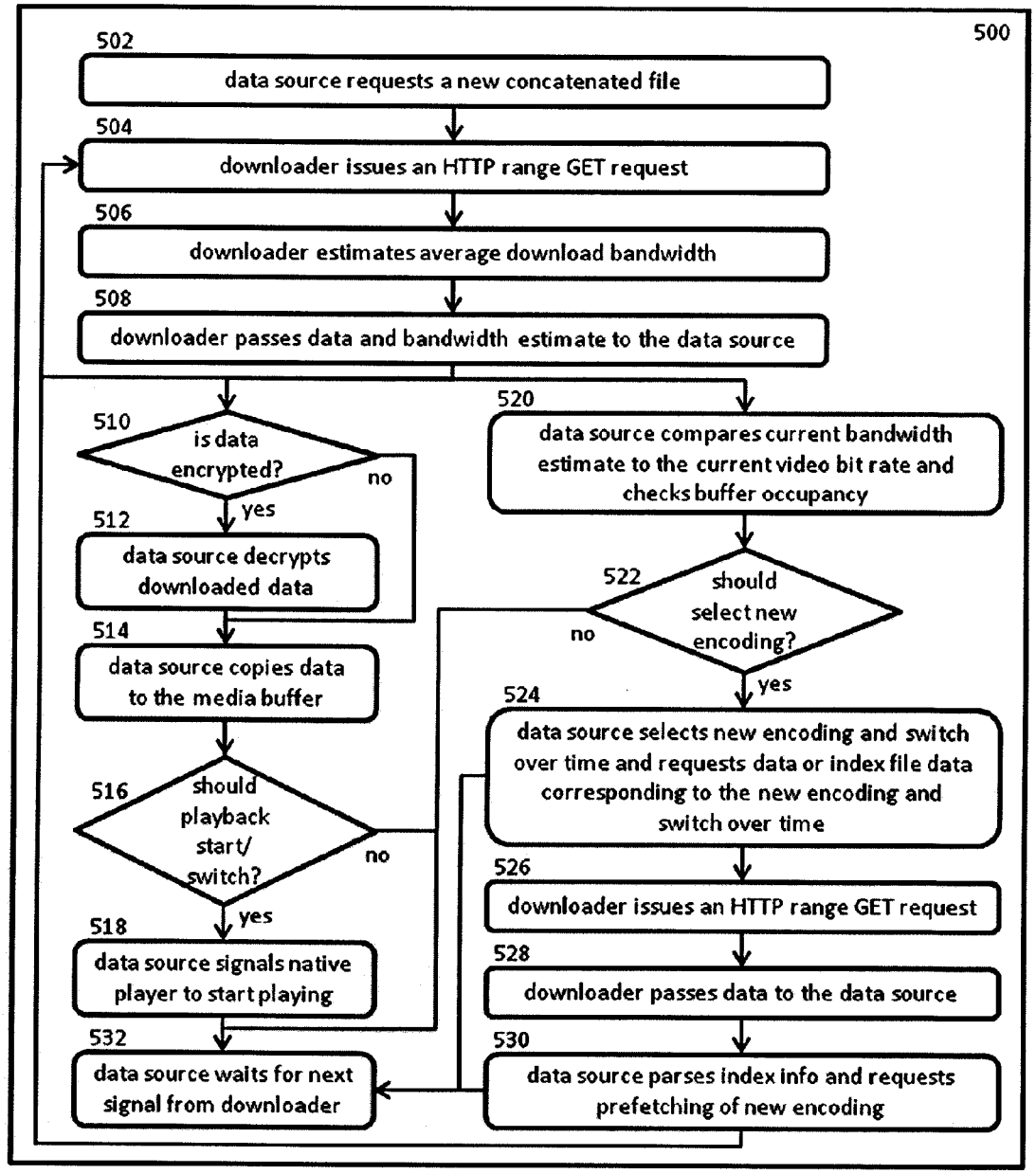
FIG. 6 is a flow chart showing a method for performing rate adaptation, in accordance with an embodiment of the present invention.

In FIG. 6 is a flow chart 500 describing the process of retrieving data and switching encodings, in accordance with one embodiment of the present invention. When a rendering request is issued for a given media, the native media player 108 notifies the data source 118 which in turn instructs the downloader 104 to start retrieving data in step 502. In step 504, the downloader 104 begins retrieving the concatenated file from the beginning. In one embodiment, the downloader 104 issues an HTTP range GET request to the HTTP server 112 for the concatenated file. In another embodiment, the downloader 104 issues an HTTP GET request with a query string specifying a range of data to retrieve. In one embodiment the range is specified in time. In another embodiment, the range is specified in frames, which directly correlate to time through a known fixed frame rate.

Download begins from the start of file so that file header information may be retrieved. It is assumed that sufficient bandwidth is available, as historical bandwidth data may not be available or current. In one embodiment, the concatenated media file is selected such that the first encoding matches the expected bandwidth availability for the network interface. In another embodiment, a query string parameter specifying the preferred initial encoding is added to the HTTP request and the server selects the a concatenated media file whose first encoding most closely matches the requested encoding.

While the data is being downloaded, the downloader 104 also estimates average bandwidth, in step 506, by periodically checking to see how much data has been downloaded and calculating a download rate. The bandwidth estimate samples are saved in a circular bandwidth history buffer. In step 508, the downloaded data and bandwidth estimate are passed to the data source 118. The downloader 104 continues back to step 504 to download the next segment of data. In one embodiment, the downloader 104 pauses before issuing the next HTTP range GET request, in order to pace the requests and limit bandwidth usage. The data source 118 processes the data and bandwidth estimates separately and in parallel. The data processing begins in step 510, while the bandwidth processing begins in step 520.

In step 510, the data source 118 checks to see if the downloaded data is encrypted. If it is encrypted it first writes the data to the decryption buffer 120 then decrypts the data, in step 512. In one embodiment, software-based decryption is performed. In another embodiment, hardware assisted decryption is performed. Once the data is decrypted, or if the downloaded data was not encrypted, the unencrypted data is copied to the media buffer 106, in step 514. In step 516, the data source 118 checks to see if the native media player 108 has already been started, or if it needs to be started, or if it needs to seek to a new position after an encoding switch. Playback will not be started unless a sufficient amount of data has been pre-buffered in the media buffer 106, to prevent under-running the native media player 108. If the native media player 108 has not been started, and the current media buffer 106 occupancy exceeds the initial buffer requirement threshold, then the native media player 108 is signaled to start playing, in step 518. If the native media player 108 has started, and an encoding change is pending, and the new encoding data has been prefetched, then the native media player 108 is signaled to seek to the new file position, in step 518. Once the native media player 108 has been signaled, or if no change is required by the native media player 108, processing proceeds to step 532 where the data source 118 goes to sleep until the next range of data is delivered by the downloader 104.

In step 520, the data source 118 checks the current bandwidth estimate and the current media buffer 106 occupancy. In step 522, the data source 118, uses the bandwidth and buffer occupancy information to determine if a change is encoding is desirable. In one embodiment, if the available bandwidth is less than the encoded bit rate and the media buffer 106 contains less than the initial buffer requirement amount a change in encoding to one of lower bit rate is desired. If the available bandwidth is greater than the encoded bit rate and the media buffer 106 has reached its maximum capacity a change in encoding to one of higher bit rate is desired. In another embodiment, if the predicted future buffer occupancy is outside the bounds of the desired buffer occupancy and one of the alternate encodings' bit rate would provide a future buffer occupancy closer to the desired buffer occupancy, then a change to the alternate encoding which should provide a future buffer occupancy closer to the desired buffer occupancy is desired.

If no bit rate changes are desired, then there is nothing to do and the data source 118 proceeds to step 532 and waits for the next bandwidth update. If a bit rate change is desired, then, in step 524, a new encoding is selected along with a switch over time. In one embodiment, the switch over time is selected as the next key frame. In another embodiment, the switch over time is selected in the future to account for round trip latency in requesting the new data. The encoding with the highest bit rate that is lower than the available bandwidth estimate is chosen as the new encoding, assuming another encoding exists that meets the criteria. In one embodiment, data for the new encoding is retrieved directly from the HTTP server 112, by issuing a new HTTP GET request containing a query string specifying the new range for which to begin retrieving data and the data source 118 proceeds directly to step 532 where it waits for the downloader to signal that the prefetch data has been retrieved. In another embodiment, the data source 118 calculates an offset into the rate map index file and asks the downloader 104 to retrieve the rate map index information.

In step 526, the downloader 104 issues the HTTP range GET to the HTTP server 112 for the rate map index file information. In step 528, the downloader 104 passes the rate map index information back to the data source 118. The data source 118 determines the concatenated file byte offset for the first frame to be prefetched from the new encoding. In step 530, the data source 118 instructs the downloader 104 to start retrieving data for the new encoding from the concatenated file byte offset. The downloader 104 proceeds to step 504, where the common download infrastructure starts retrieving data from the new offset. The data source 118 proceeds to step 532 where it waits for the downloader to signal that the prefetch data has been retrieved.

Figure 7:
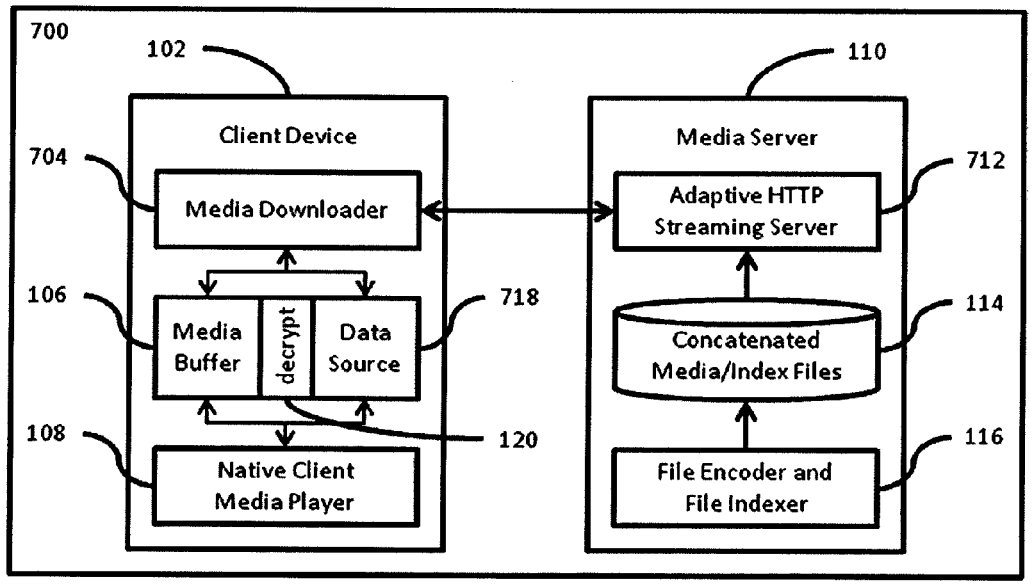
FIG. 7 is a block diagram of a second system which is capable of conducting procedures, in accordance with various embodiments of the invention.

In FIG. 7 is a block diagram 700 for another embodiment of the present invention. It shows the client device 102 and media server 110 from block diagram 100 with three component changes. The standard HTTP server 112 has been replaced with a custom adaptive HTTP streaming server 712, and the downloader 104 and data source 118 have been replaced with a simplified downloader 704 and a simplified data source 718 which do not require bandwidth estimation capabilities. An example of a suitable adaptive HTTP streaming server 712 is described in PCT Application No. PCT/US09/60120 filed Oct. 9, 2009 and entitled, Method And Apparatus For Efficient Http Data Streaming.

The streaming server 712 communicates with the client 102 via the standard HTTP protocol. The streaming server 102 accepts query strings specifying an initial encoding. The streaming server selects a concatenated file with a first encoding that matches as closely as possible the requested encoding. The data is sent to the client in a paced manner to limit the bandwidth used by the server 110 and the client 102. The streaming server 712 monitors TCP window fullness to estimate client bandwidth. As bandwidth decreases, TCP back pressure will cause the server-side TCP window to fill up. When this begins to occur, the streaming server 712 will detect congestion and switch encodings. The HTTP data is sent using the transfer encoding type chunked. At the beginning of each HTTP chunk is a header specifying the encoding, time-based position and concatenated file byte offset for the data within that chunk. Use of HTTP chunking and methods for packing headers into a chunk should be known to those skilled in the art. The downloader 704 extracts the data and the encoding information from the HTTP chunks and pass them to the data source 718. The data source 718 places the data either in the media buffer 106 or in the temporary decryption buffer 120, as before. The data source 718 also checks the encoding information for the chunk and checks it against the previous encoding information. If it matches, then no encoding change has occurred. If it doesn't match, then the offset information is used to notify the native player 108 to seek to the new position, corresponding to the new encoding data received.

Figure 8:
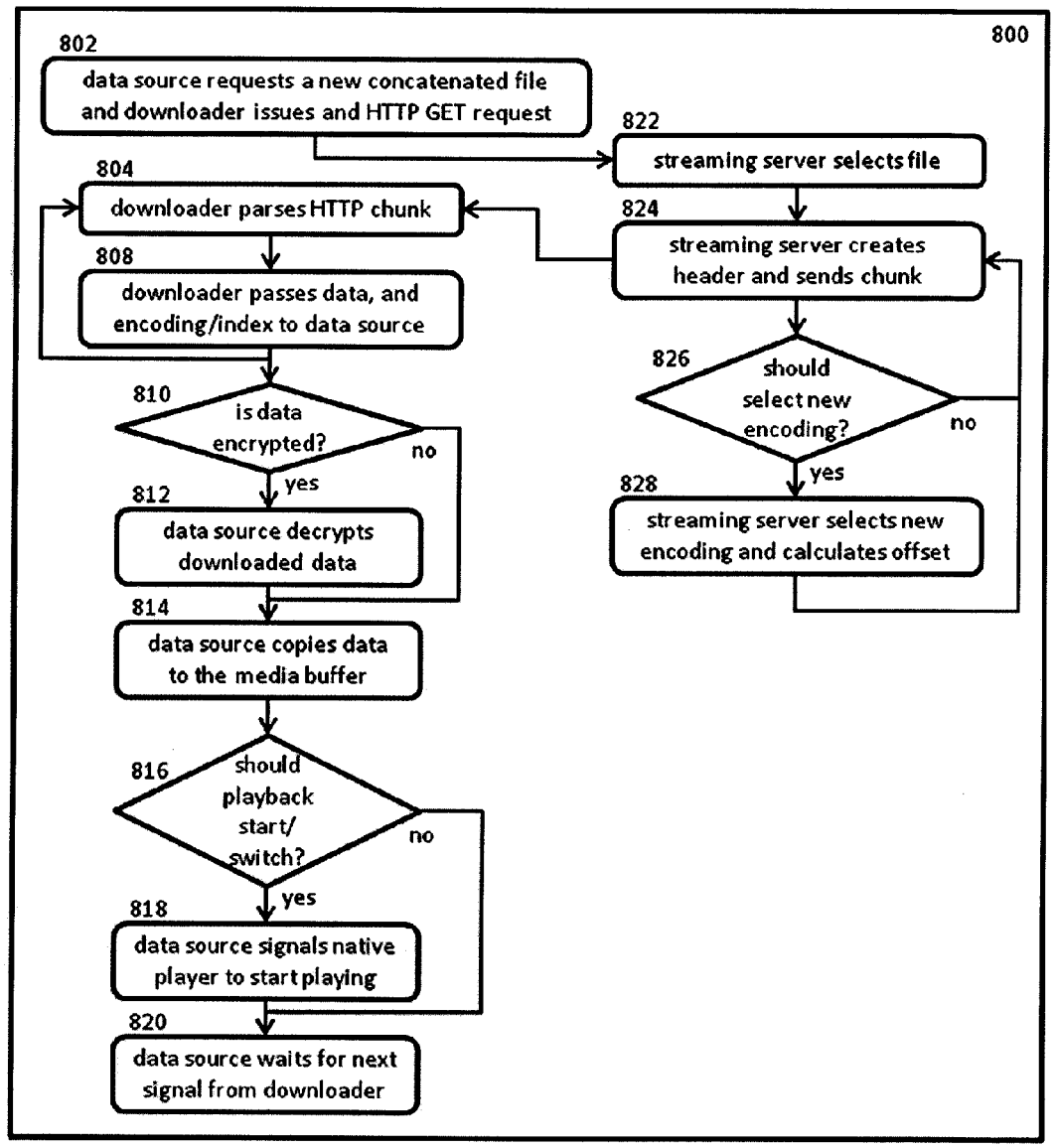
FIG. 8 is a flow chart showing a third method for performing rate adaptation, in accordance with an embodiment of the present invention.

In FIG. 8 is a flow chart 800 describing a process of retrieving data and switching encodings, in accordance with another embodiment of the present invention. When a rendering request is issued for a given media, the native media player 108 notifies the data source 718 which in turn instructs the downloader 704 to start retrieving data in step 802. The downloader 704 begins retrieving the concatenated file from the beginning. It issues an HTTP GET request to the adaptive HTTP streaming server 712 for the entire concatenated file. Download begins from the start of file so that file header information may be retrieved. The streaming server 718 selects the file to use in step 822. The HTTP GET request contains a query string specifying the encoding to be retrieved. In one embodiment, the encoding is omitted on the initial request and a default concatenated file is chosen. In another embodiment, a concatenated file is chosen such that the first encoding in the concatenated file matches the requested encoding. If a concatenated file whose first encoding matches the requested encoding cannot be found, a default file is chosen. In one embodiment, the HTTP GET request also specifies a start position. In one embodiment the start position is specified in time. In another embodiment, the start position is specified in frames, which directly correlate to time through a known fixed frame rate.

In step 824, the streaming server 712 creates the header containing the encoding, time-based position, and rate map index information for the current segment of data and sends the first HTTP chunk containing the header and data to the client 102. In step 804, the downloader 704 parses the HTTP chunk extracting the file data as well as the encoding and rate map index information. In step 808, the downloaded data and encoding and rate map index information are passed to the data source 718. The downloader 704 continues back to step 804 to wait for the next HTTP chunk. The data source 718 begins processing the data and encoding and rate map index information in step 810. The streaming server 712 processing continues in parallel in step 826.

The data processing steps 810 through 818 are identical to those of steps 510 through 518 from process 500 discussed above. In step 810, the data source 718 checks to see if the downloaded data is encrypted. If it is encrypted it first writes the data to the decryption buffer 120 then decrypts the data, in step 812. In one embodiment, software-based decryption is performed. In another embodiment, hardware assisted decryption is performed. In one embodiment, the decryptor is initialized with the rate map index information supplied by the streaming server 712 for the current data, since many decryption schemes are data byte offset dependent, as should be known to those skilled in the art. Once the data is decrypted, or if the downloaded data was not encrypted, the unencrypted data is copied to the media buffer 106, in step 814. In step 816, the data source 718 checks to see if the native media player 108 has already been started, or if it needs to be started, or if it needs to seek to a new position after an encoding switch. An encoding switch is determined by comparing the encoding information provided by the streaming server 712 with the current data, to the encoding information provided by the streaming server 712 for the previous data. If the encodings differ, then a server initiated encoding switch has occurred. Playback will not be started unless a sufficient amount of data has been pre-buffered in the media buffer 106, to prevent under-running the native media player 108. If the native media player 108 has not been started, and the current media buffer 106 occupancy exceeds the initial buffer requirement threshold, then the native media player 108 is signaled to start playing, in step 818. If the native media player 108 has started, and an encoding change is pending, then the native media player 108 is signaled to seek to the new file position, in step 818. Once the native media player 108 has been signaled, or if no change is required by the native media player 108, processing proceeds to step 820 where the data source 718 goes to sleep until the next chunk of data is delivered by the downloader 704.

In step 826, the streaming server 712 checks to see if an encoding change is desired. In one embodiment, the streaming server 712 estimates the bandwidth available by measuring the amount of data accepted to the TCP window. If a non-blocking write is issued for an amount of data greater than the TCP window size, data equal to the amount of space left in the TCP window will be accepted. The current window occupancy can be estimated as (T−W), where T is the TCP window capacity and W is the amount of data written. The streaming server 712 maintains a history of window occupancy. The change in available bandwidth may be calculated as the difference what the streaming server 712 attempted to send, and what is still left in the TCP window, over the period. If the estimated available bandwidth falls below a certain threshold, or climbs above an alternate threshold, a change in encoding is desired.

If no change in encoding is desired, processing continues back to step 824, where the next HTTP chunk is sent to the client 102. In one embodiment, the streaming server 711 pauses before sending the next HTTP chunk, in order to pace the requests and limit bandwidth usage. The streaming server 712 knows the bit rate of the given encoding, and pauses for a time equal to (D/R*M) where D is the size of the file data segment, R is the bit rate of the current encoding and M is a multiplier greater than one used to decrease the time between sends to prevent under-running the client 102. Otherwise, if an encoding change is desired, then processing continues to step 828. In step 828, a new encoding is selected. In one embodiment, the streaming server 712 sequentially selects new rates based on bit rate. This is an optimistic algorithm for environments that expect low variations in available bit rate. In such an environment, stepping down to the next lowest bit rate or stepping up to the next highest bit rate provides the least noticeable change both to network bandwidth and user perception. In another embodiment, the streaming server 712 selects the encoding whose bit rate is closest to the bandwidth estimation.

Figure 9:
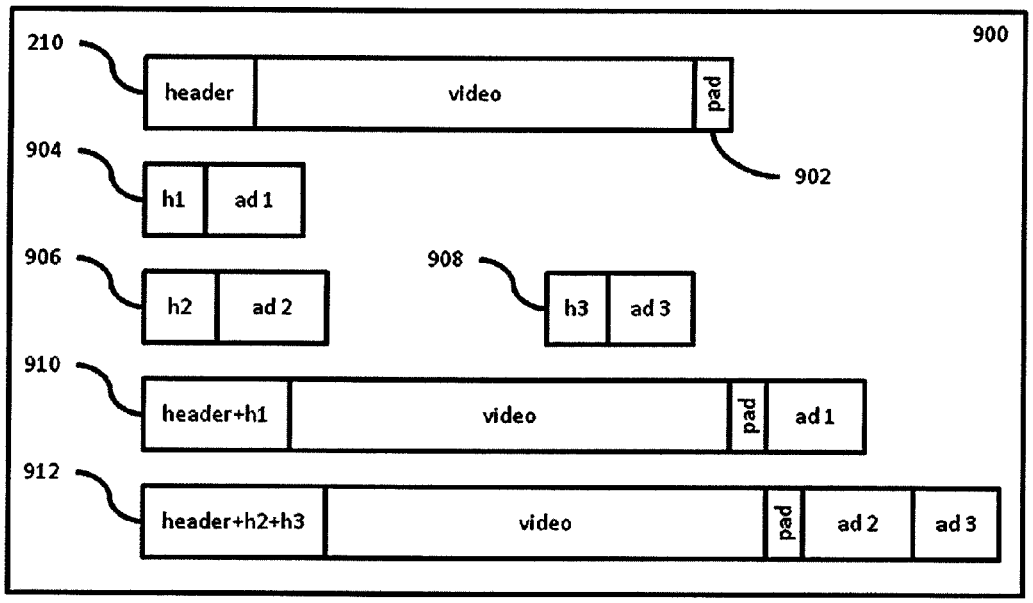
FIG. 9 is a diagram of the files used to create ad stitched files, in accordance with an embodiment of the present invention.

FIG. 9 is a diagram 900 of files 210, 904, 906, and 908 used to create ad stitched media files 910 and 912. In one embodiment, the feature content is a concatenated file 210, suitable for use with the dynamic rate adaptation methods of embodiments of the present invention. The feature content is padded with padding 902, which is separate from the concatenation padding 212. The padding 902 serves two purposes: to equalize the audio and video track durations and to provide a consistent baseline for stitching. When stitching a first video to a second video, because of the compression schemes used, the last few frames of the first video and the first few frames of the second video may be altered to achieve the best possible compression. By padding out the feature content 210 with a neutral padding 902, stitching to this baseline should not cause frame distortion in the second video. These techniques should be known to those skilled in the art. In one embodiment, the ads 904, 906, and 908 may all be of the same duration. In another embodiment, the ads 904, 906, and 908 may all be of different durations. Even if ads 904, 906, and 908 are of the same duration, their file sizes will most likely differ due to variability in compression for the actual content. In one embodiment, the ads 904, 906, and 908 may be concatenated files, suitable for use with the dynamic rate adaptation methods of embodiments of the present invention. The stitching media files 910 and 912 are created by stitching the feature content 210, with its padding 902, to one or more ads. Stitched media file 910 shows the feature content 210, with its padding 902, stitched to ad 904. Stitched media file 912 shows the feature content 210, with its padding 902, stitched to ads 906 and 908.

Figure 10:
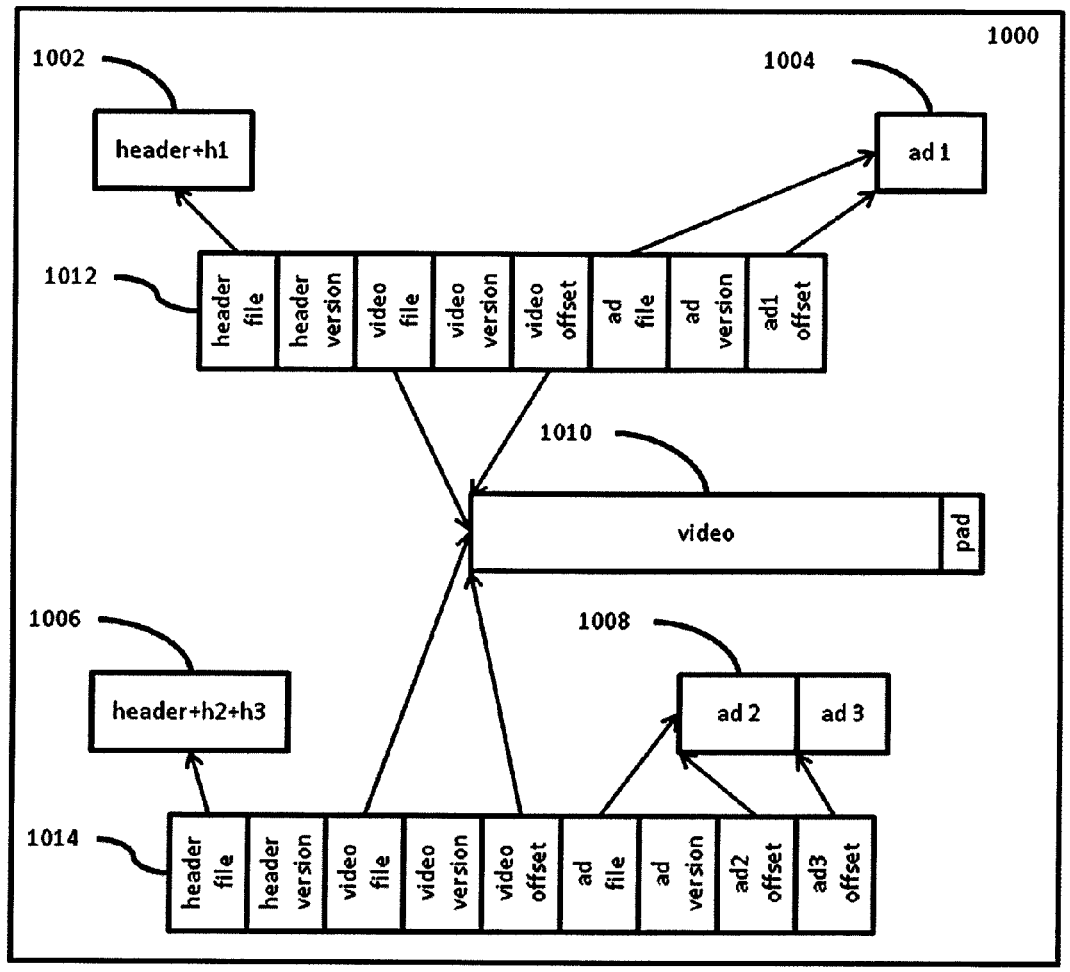
FIG. 10 is a diagram of file particles and particle index file used to dynamically rotate ads, in accordance with an embodiment of the present invention.

FIG. 10 is a diagram 1000 of file particles 1002, 1004, 1006, 1008, and 1010 and particle index files 1012 and 1014, which are created from the stitched media files 910 and 912. Dynamic header particles 1002 and 1006 consist of header information from the stitched media files 910 and 912, respectively. Static particle 1010 consists of the feature content 210 plus padding 902, without any header information. Dynamic ad particles 1004 and 1008 consist of the stitched ads from the stitched media files 910 and 912, respectively. The particles 1002, 1004, 1006, 1008, and 1010 are created by dividing the stitched media files 910 and 912 at the exact stitched media file byte offset of the first frame of the feature content 210 and the first frame of the first ad (904 or 906) stitched to the feature content 210, respectively. The particle index files 1012 and 1014 contain file name information for locating each particle, particle version information for determining if the particles have changed, and clip offset information to determine the stitched media file byte offset of the clip.

The header information contained in the header particle (1002 or 1006) contains mapping information for frames in the stitched media file. The mapping information contains stitched media file byte offset information specific to the container format of the stitched media file, as should be known to those skilled in the art. The stitched media file byte offset of the first frame of the feature content 210 will be different, depending upon how much header information is in the file. Given a stitched media file with header 1002 length H and feature content particle 1010 length F (including padding 902), the first frame of the feature content 1010 will begin at a stitched media byte offset of H, and the ads 1004 will begin at an offset H+F. However, if different ads are stitched to the feature content 1010, then the new header 1006 length H' may be different from the previous header length H, causing the first frame of the feature content to begin at a stitched media byte offset of H', and the ads 1008 to begin at offset H'+F. These offsets allow the data source 118 to reuse the same feature content particle 1010, while changing the ad particle (e.g. from 1004 to 1008) as long as it knows the proper offsets and file locations.

Figure 11:
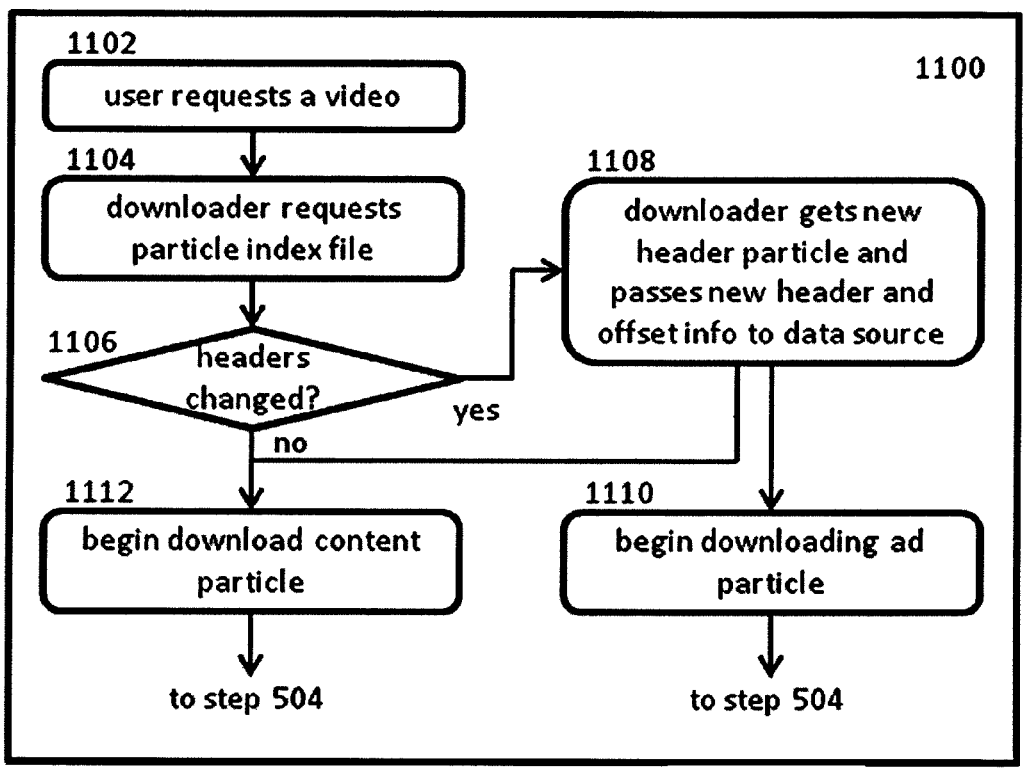
FIG. 11 is a flow chart showing a method for retrieving particles, in accordance with an embodiment of the present invention.

FIG. 11 is a flow chart 1100 showing a method for retrieving stitched media file particles for use in ad rotation. This procedure may be implemented as part of the initialization step 502 in procedure 500. When the user requests a video in step 1102, rather than immediately proceeding to step 504 to download the feature content 210, the downloader 104 first retrieves the most current particle index file (e.g., 1012 or 1014). In step 1104, the downloader 104 checks to see if the header version is different from any cached version. If the header version has not changed, then processing proceeds to step 1112 and process 500 is initiated at step 504 for downloading the feature content particle 1010. If the header version is different from the cached version, or if no cached version exists, processing proceeds to step 1108 where the new header particle (e.g., 1002 or 1006) is downloaded and passed to the data source 118. The data source 118 replaces any previous header particle information in the media buffer 106, with the new header particle information. The data source 118 makes note of the offset values from the header particle (e.g., 1002 or 1006) for use in managing the circular media buffer 106. Once the headers are downloaded two separate download processes are initiated. Both download processes follow the procedure 500, starting at step 504. From step 1112, download of the feature content particle 1010 is initiated. From step 1114, download of the ad particle (e.g., 1004 or 1008) is initiated.

The procedure for displaying ads is similar to that of changing rates. A list of ad insertion points, based on time offsets in the feature content 210, are provided to the data source 118. When an ad is to be displayed, the data source 118 signals the native client media player 108, to seek to the position in the stitched media file where the ad resides. Once the ad has finished playing, the data source 118 signals the native client media player 108, to seek to the position in the stitched media file where the feature content 1010 left off.

Figures 12, 13:
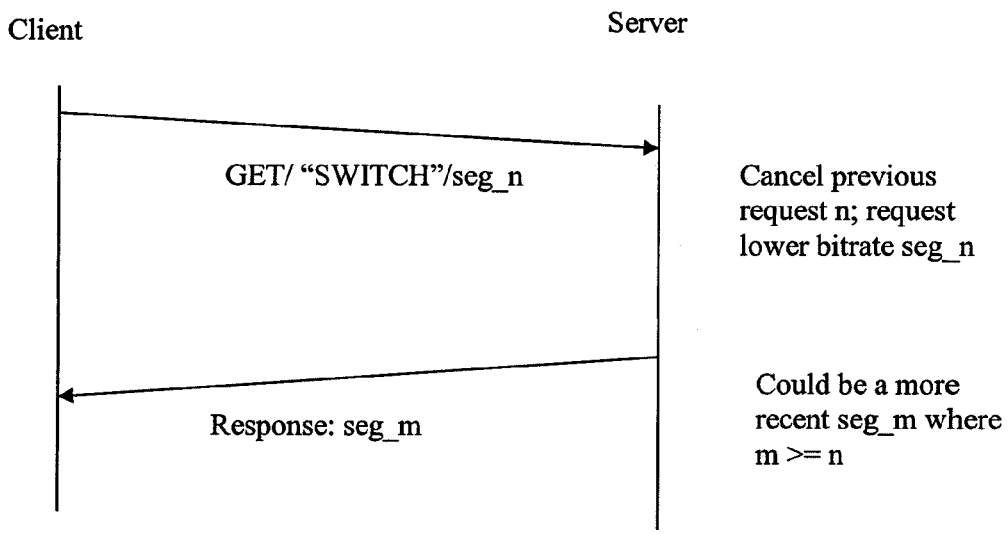
FIG. 12 shows an interchange involving a special server interaction.
FIG. 13 shows a segment structure for the interaction of FIG. 12.

FIGS. 12 and 13 illustrate the above-mentioned special server modification, in which the server responds to a special http GET command with a mime-header labeled "SWITCH" to cancel the last segment request and request at a lower bitrate. This request may also used to send the acknowledgment to squelch retransmissions. The switch command is used to propagate the squelch upwards through the application and enable the server to switch to a new lower bitrate at the next segment indicated in the body of the request. The server could choose to advance to a more recent segment in the response as indicated via a SWITCH response header. The interchange is shown in FIG. 12. FIG. 13 shows the structure of the segment including the segment number that indicates to the client the position of the segment in the stream and that corresponds to the data in the segment.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

What is claimed is:

1. A system for delivering a media content stream to a nomadic endpoint, wherein the delivery adapts to network conditions by dynamically changing between different download rates without any involvement of an end user, comprising:

a network aware adaptive streaming (NAAS) server; and
a client device as the nomadic endpoint, the client device being coupled to the NAAS server by a network and including a media player, a segment downloader and a stream assembler, the network including one or more mobile networks with highly variable delays and losses depending on location, the media player being operative to render a media object assembled by the stream assembler from segments retrieved by the segment downloader, the segment downloader being operative to (i) measure network bandwidth usage while downloading segments from the NAAS server and (ii) monitor a time required to render a remaining amount of previously received and buffered media data, and being further operative to respond to the measured network bandwidth and the monitored time to effect transitions between different download rates to be used for downloading different segments from the NAAS server, each download rate related to a corresponding distinct encoded bitrate at which the media object is encoded, the transitions including a transition from a first download rate corresponding to a first encoded bitrate to a second lower download rate corresponding to a second lower encoded bitrate effected by the segment downloader in response to the measured network bandwidth falling below a threshold bandwidth needed to download a smallest playable segment at the first encoded bitrate over a current time required to render a currently remaining amount of previously received and buffered media data.

2. The system of claim 1, wherein the adaptation is achieved by the NAAS server sending content in portions contained in individual files and encoded at a correct bitrate in response to requests from the client device.

3. The system of claim 1, wherein sourcing of content is achieved by a multiplicity of NAAS servers sending simultaneously to the nomadic endpoint.

4. The system of claim 1, wherein the delivery is to multiple nomadic endpoints over heterogeneous mobile communications providers.

5. The system of claim 1, wherein delivery employs an underlying reliable transport protocol capable of retransmission of non-received packets, and wherein the segment downloader is operative to selectively prevent retransmission of non-received packets based on operating conditions.

6. The system of claim 5, wherein a non-received packet is not retransmitted in the case that there is insufficient time for retransmission before content in the packet is to be played.

7. The system of claim 5, wherein a non-received packet is not retransmitted in the case that the network is experiencing prolonged congestion.

8. The system of claim 1, wherein a multiplicity of metadata associated with the content from user-generated interactions and content-provider generation are created and stored in a database on a server and/or nomadic endpoint.

9. The system of claim 8, wherein the content and/or the associated metadata is shared with other users of the content.

10. The system of claim 1, wherein a multiplicity of bookmarks associated with the content from user-generated interactions are created and stored in a database on a server and/or nomadic endpoint.

11. The system of claim 1, wherein the end user can play the content in an offline mode where the nomadic endpoint is no longer connected to the network.

12. The system of claim 1, wherein Digital Rights Management (DRM) policies of a content provider are enforced.

13. The system of claim 1, wherein the segment downloader is further operative, in response to the measured bandwidth falling below the predetermined threshold corresponding to the bandwidth required to download the smallest playable chunk, to notify the media player that insufficient bandwidth exists.

14. The system of claim 5, wherein preventing retransmission of non-received packets includes sending acknowledgments for the non-received packets.

15. The system of claim 5, wherein preventing retransmission of non-received packets includes resetting a reliable transport protocol connection over which the segments are being downloaded.

16. The system of claim 15, wherein preventing retransmission further includes sending a switch command to the NAAS server to cause the NAAS server to cancel a most recent segment request and enable the NAAS server to switch to a new lower encoding bitrate at a next segment to be delivered.

17. A method of delivering a media content stream to a nomadic endpoint, including adapting delivery to network conditions by dynamically changing between different download rates without any involvement of an end user, comprising the steps, performed by a client device as the nomadic endpoint and coupled to a network aware adaptive streaming (NAAS) server by one or more mobile networks with highly variable delays and losses depending on location, of:

operating a media player, a segment downloader and a stream assembler at the client device, the media player being operative to render a media object assembled by the stream assembler from segments retrieved by the segment downloader; and by the segment downloader, (i) measuring network bandwidth usage while downloading segments from the NAAS server and (ii) monitoring a time required to render a remaining amount of previously received and buffered media data, and responding to the measured network bandwidth to effect transitions between different download rates to be used for downloading different segments from the NAAS server, each download rate related to a corresponding distinct encoded bitrate at which the media object is encoded, the transitions including a transition from a first download rate corresponding to a first encoded bitrate to a second lower download rate corresponding to a second lower encoded bitrate effected by the segment downloader in response to the measured network bandwidth falling below a threshold bandwidth needed to download a smallest playable segment at the first encoded bitrate over a current time required to render a currently remaining amount of previously received and buffered media data.

18. The method of claim 17, wherein the adaptation is achieved by the NAAS server sending content in portions contained in individual files and encoded at a correct bitrate in response to requests from the client device.

19. The method of claim 17, wherein sourcing of content is achieved by a multiplicity of NAAS servers sending simultaneously to the nomadic endpoint.

20. The method of claim 17, wherein the delivery is to multiple nomadic endpoints over heterogeneous mobile communications providers.

21. The method of claim 17, wherein delivery employs an underlying reliable transport protocol capable of retransmission of non-received packets, and further including, by the segment downloader, selectively preventing retransmission of non-received packets based on operating conditions.

22. The method of claim 21, wherein a non-received packet is not retransmitted in the case that there is insufficient time for retransmission before content in the packet is to be played.

23. The method of claim 21, wherein a non-received packet is not retransmitted in the case that the network is experiencing prolonged congestion.

24. The method of claim 17, wherein a multiplicity of metadata associated with the content from user-generated interactions and content-provider generation are created and stored in a database on a server and/or nomadic endpoint.

25. The method of claim 24, wherein the content and/or the associated metadata is shared with other users of the content.

26. The method of claim 17, wherein a multiplicity of bookmarks associated with the content from user-generated interactions are created and stored in a database on a server and/or nomadic endpoint.

27. The method of claim 17, wherein the end user can play the content in an offline mode where the nomadic endpoint is no longer connected to the network.

28. The method of claim 17, wherein Digital Rights Management (DRM) policies of a content provider are enforced.

* * * * *